US010174602B2

(12) United States Patent
Maxey et al.

(10) Patent No.: US 10,174,602 B2
(45) Date of Patent: Jan. 8, 2019

(54) FLOW CONDITIONING OPENINGS

(71) Applicant: Halliburton Energy Services, Inc., Houston, TX (US)

(72) Inventors: Jason Eric Maxey, Spring, TX (US); Ronald Glen Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/315,026

(22) PCT Filed: Aug. 8, 2014

(86) PCT No.: PCT/US2014/050310
§ 371 (c)(1),
(2) Date: Nov. 30, 2016

(87) PCT Pub. No.: WO2016/022146
PCT Pub. Date: Feb. 11, 2016

(65) Prior Publication Data
US 2017/0191358 A1 Jul. 6, 2017

(51) Int. Cl.
*E21B 43/114* (2006.01)
*E21B 43/26* (2006.01)
(Continued)

(52) U.S. Cl.
CPC .............. *E21B 43/267* (2013.01); *C09K 8/80* (2013.01); *E21B 34/12* (2013.01); *E21B 43/114* (2013.01);
(Continued)

(58) Field of Classification Search
CPC ...... E21B 43/26; E21B 43/267; E21B 43/114; C09K 8/80
See application file for complete search history.

(56) References Cited

U.S. PATENT DOCUMENTS 4,762,067 A 8/1988 Barker et al.
4,880,059 A 11/1989 Brandell et al.
(Continued)

FOREIGN PATENT DOCUMENTS

WO 2002070860 A1 9/2002
WO 2016022146 A1 2/2016

OTHER PUBLICATIONS

International Search Report and Written Opinion for PCT/US2014/050310 dated May 1, 2015.

*Primary Examiner* — Zakiya W Bates
(74) *Attorney, Agent, or Firm* — McGuireWoods LLP

(57) ABSTRACT

A flow conditioning opening may be used to manipulate the flow of particulates in a particulate laden fluid in a downhole environment. The particulate flow may be manipulated towards or away from openings downstream of the flow conditioning opening. For example, a perforation cluster may include a flow conditioning opening extending from the wellbore into the subterranean formation that is aligned axially along the wellbore with and uphole of a perforation, wherein the flow conditioning opening has at least one of the following characteristics selected from the group consisting of: the flow conditioning opening having a smaller cross-sectional area at a wellbore face than the perforation, the flow conditioning opening having a smaller volume in the subterranean formation than the perforation, the flow conditioning opening having a smaller depth into the subterranean formation than the perforation, and any combination thereof.

19 Claims, 10 Drawing Sheets

(51) Int. Cl.
    *E21B 43/267*     (2006.01)
    *E21B 43/14*     (2006.01)
    *C09K 8/80*     (2006.01)
    *E21B 34/12*     (2006.01)
    *E21B 43/117*     (2006.01)
    *E21B 34/00*     (2006.01)

(52) U.S. Cl.
    CPC ............ *E21B 43/117* (2013.01); *E21B 43/14* (2013.01); *E21B 43/26* (2013.01); *E21B 2034/007* (2013.01)

(56) References Cited

U.S. PATENT DOCUMENTS

| | | |
|---|---|---|
| 5,636,691 A | 6/1997 | Hendrickson et al. |
| 5,988,271 A | 11/1999 | Oneal et al. |
| 6,772,837 B2 | 8/2004 | Dusterhoft et al. |
| 6,851,471 B2 | 2/2005 | Barlow et al. |
| 7,874,365 B2 | 1/2011 | East, Jr. et al. |
| 7,882,894 B2 | 2/2011 | Nguyen et al. |
| 8,631,872 B2 | 1/2014 | East, Jr. |
| 2005/0133226 A1 | 6/2005 | Lehman |
| 2007/0158109 A1 | 7/2007 | Zazovsky et al. |
| 2010/0000727 A1 | 1/2010 | Webb et al. |
| 2010/0044041 A1 | 2/2010 | Smith et al. |
| 2011/0000669 A1 | 1/2011 | Barlow et al. |
| 2011/0088915 A1 | 4/2011 | Stanojcic et al. |
| 2013/0264054 A1 | 10/2013 | East et al. |

FLOW CONDITIONING OPENINGS

BACKGROUND

The present application relates to directing the flow of particulates in a particulate laden fluid in a downhole environment.

Particulates are often utilized in various wellbore operations. For example, after a wellbore is drilled, it may often be necessary to fracture the subterranean formation to enhance hydrocarbon production, especially in shale formations that typically have high closure stresses. Access to the subterranean formation can be achieved by first creating perforations in the casing or liner that extends through the cement sheath surrounding the casing or liner (when present) and, in some instances, into the formation. Then, fractures in the subterranean formation may be created or extended from the perforations (e.g., by hydraulic fracturing or slickwater fracturing). Generally, proppants are then introduced into the fractures to form proppant packs that hold open the fractures and maintain fluid flow therethrough after the fracturing operation is completed. In hydrocarbon production operations, the propped fractures provide conduits for the hydrocarbons to flow from the subterranean formation to the wellbore and eventually to the surface.

Because the proppant packs hold open the fractures during production, the distribution of the proppants to the various fractures during the fracturing operation impacts hydrocarbon production. That is, homogenous proppant distribution extending deep into the formation for each of the plurality of fractures is preferred to maximize hydrocarbon production. However, typically in practice, the proppant distributes heterogeneously between the fractures and, often, only a small percentage of fractures contain proppant packs that extend deep into the formation. Heterogeneous proppant distribution often hydrocarbon yields significant hydrocarbon production for a shorter amount of time that, then, declines rapidly. This is most often observed in shale and other very low permeability formations with high closure pressures. Enhancing hydrocarbon production after the decline typically involves refracturing, which can be costly and time consuming.

One method for achieving a more homogeneous proppant distribution includes forming proppant packs in a sequential subset of fractures. For example, a packer or bridge plug may be used between subsets of fractures to place proppant in that subset of fractures. Then, the packer or bridge plug is moved or removed and another subset of fractures is isolated for proppant placement. However, this procedure is time consuming and costly.

In some instances, a crossover tool may be used in conjunction with packer or bridge plug to direct fluid flow and, consequently, particulate flow in a radially outward direction to enhance particulate flow into the perforations and fractures. However, because of this significant change in direction (about a 90° diversion), portions of the crossover tool are subject to significant wear from the abrasive proppant particulates. In addition, the crossover tool may perform several other tasks while the proppant laden fluid is being pumped through it. For example, the crossover tool typically contains longitudinal circulation ports through which fracturing fluids that are not received into the formation after exiting the crossover are transmitted back to the surface. If the crossover tool is worn away such that the proppant laden fluid achieves fluid communication with the circulation ports in the crossover, the proppant laden fluid will enter the circulation ports in the crossover and travel back to the surface without delivering the proppant to the formation. Then, the crossover tool must be replaced, which is costly and time consuming.

Therefore, directing particulate flow in a downhole environment may be useful for enhancing proppant pack homogeneity and mitigating abrasive wear to increase the lifetime of wellbore tool.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to directing the flow of particulates in a particulate laden fluid in a downhole environment. Specifically, a flow conditioning opening may be used to manipulate particulate flow relative downstream openings (e.g., towards or away from). In some instances, the openings may be perforations where the flow conditioning opening may produce a more homogenous proppant distribution in the fractures extending from the downstream perforations. In some instances, the openings may be holes in a tool (e.g., a sandscreen or crossover tool) where the flow conditioning opening may be useful in directing particulate flow to mitigate wear associated with unequal particulate flow through downstream holes.

As used herein, the term "upstream" refers to an earlier location relative to a fluid flow direction, and "downstream" refers to a location latter relative to a fluid flow direction. As used herein, the term "uphole" refers a location or direction along or within a wellbore towards the wellhead, and "downhole" refers a location or direction along or within a wellbore towards the drilled end of the wellbore. Use of any one or more of the foregoing terms shall not be construed as denoting locations that are necessarily aligned along the wellbore.

As used herein, the term "aligned axially along the wellbore" or grammatical derivations thereof refer to two or more objects situated along the axis of the wellbore but not spaced apart radially by more than about 10°.

I. Perforating, Fracturing, and Placing Proppant

Figure 1:
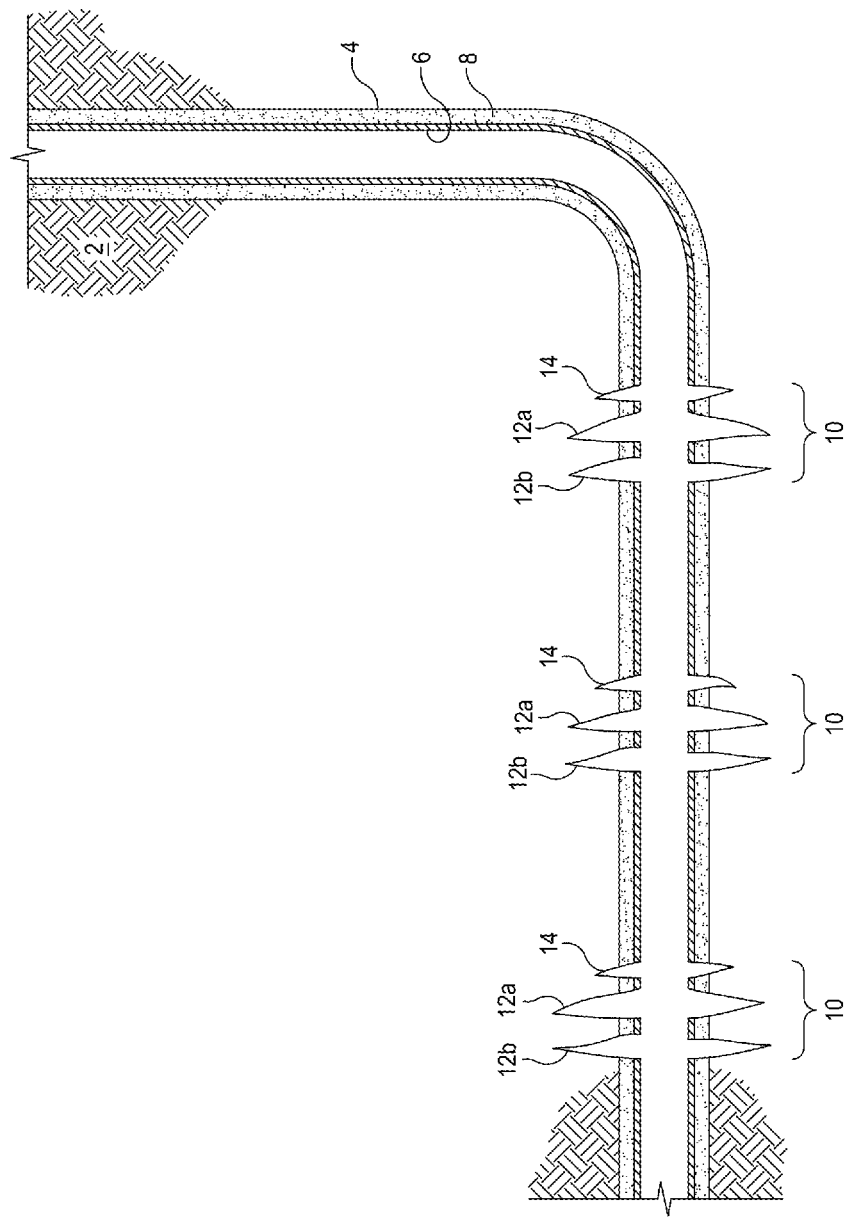
FIG. 1 illustrates a diagram of a perforated wellbore penetrating a subterranean formation with a casing cemented therein with cement sheath.

FIG. 1 provides a diagram of a wellbore 4 penetrating a subterranean formation 2 with a casing 6 cemented therein with cement sheath 8. As illustrated, there are three perforation clusters 10 along the wellbore 4 according to at least some embodiments described herein. As used herein, the term "perforation cluster" refers to a grouping of perforations along the length of the wellbore defined by non-perforated portions of the wellbore on either end of the perforation cluster. Each of the three perforation clusters 10 includes a flow conditioning opening 14 extending from the wellbore 4 into the subterranean formation 2, a first perforation 12a, and a second perforation 12b that are aligned axially along the wellbore with the flow conditioning opening 14 uphole of the first and second perforations 12a,12b.

Figure 2:
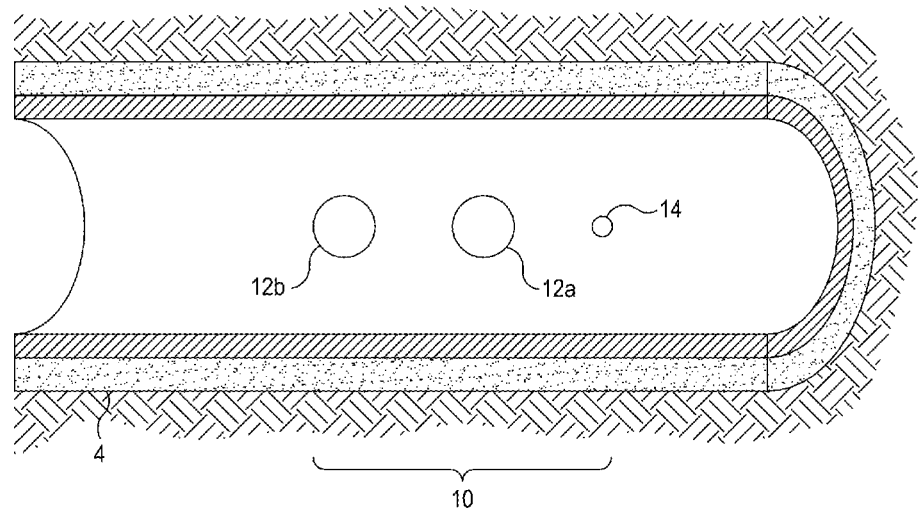
FIG. 2 illustrates a cross-sectional diagram along a portion of the wellbore at a perforation cluster of FIG. 1.

FIG. 2 provides an cross-sectional diagram along a portion of the wellbore 4 at a perforation cluster 10 of FIG. 1. The flow conditioning opening 14 is uphole of the two perforations 12a,b.

Without being limited by theory, it is believed that fluid flow and, consequently, particulate (e.g., proppant or gravel) location within the wellbore 4 may be manipulated by the flow conditioning opening 14 (or the equivalent flow condition opening in the further examples provided herein) having at least one of the following characteristics: having a smaller cross-sectional area at the wellbore face (or equivalent location for other flow condition openings in the further examples provided herein), having a smaller volume in the subterranean formation, having a smaller depth into the subterranean formation, or any combination thereof. For example, as illustrated in FIGS. 1-2, the flow conditioning opening 14 has a smaller cross-sectional area at the wellbore face than the two downhole perforations 12a,b, a smaller volume in the subterranean formation than the two downhole perforations 12a,b, and having a smaller depth into the subterranean formation than the two downhole perforations 12a,b.

In some embodiments, the cross-sectional area of each of the two perforations 12a,b at the wellbore face may independently be at least about 1.1 times greater than the cross-sectional area of the flow conditioning opening 14 at the wellbore face (e.g., about 1.1 to about 20 times greater, about 2 to about 20 times greater, about 5 to about 20 times greater, about 5 to about 15 times greater, about 2 to about 10 times greater, or about 5 to about 10 times greater including any subsets therebetween).

In some embodiments, the volume of each of the two perforations 12a,b in the subterranean formation 2 may independently be at least about 2 times greater than the volume of the flow conditioning opening 14 in the subterranean formation 2 (e.g., about 2 to about 100 times greater, about 5 to about 100 times greater, about 10 to about 100 times greater, about 5 to about 75 times greater, about 5 to about 50 times greater, or about 10 to about 50 times greater including any subsets therebetween).

In some embodiments, the depth into the subterranean formation 2 of each of the two perforations 12a,b may independently be at least about 1.5 times greater than the depth into the subterranean formation 2 of the flow conditioning opening 14 (e.g., about 1.5 to about 100 times greater, about 2 to about 100 times greater, about 5 to about 100 times greater, about 2 to about 75 times greater, about 2 to about 50 times greater, or about 5 to about 50 times greater including any subsets therebetween).

Figure 3:
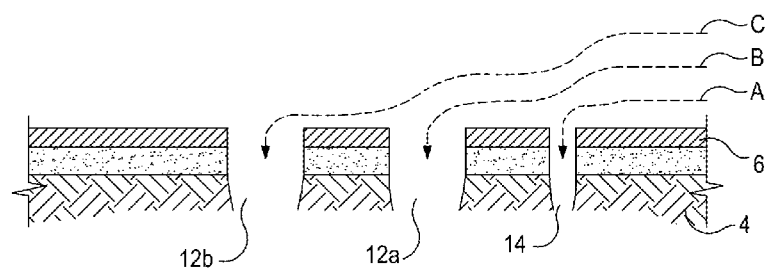
FIG. 3 illustrates an illustration of fluid flow within the wellbore during the proppant placement operation.

FIG. 3 provides an illustration of fluid flow within the wellbore 4 during the proppant placement operation. As fluid flows down the wellbore 4 and encounters the flow conditioning opening 14, the fluid closest to casing 6 flows into the flow conditioning opening 14, illustrated as fluid flow line A. As the fluid flows along line A and into the flow conditioning opening 14, the fluid flowing along fluid flow lines B and C are pulled closer to the casing 6. The fluid flowing along line B then flows into the first perforation 12a downstream of the flow conditioning opening 14. As a result, the fluid flowing along lines C moves closer to the casing 6 and eventually into the second perforation 12b downstream of the first perforation 12a. It is believed that as a proppant laden fluid flowing down the wellbore 4, the proppant tends to accumulate in the center of the wellbore 4 and away from the casing 6. Therefore, the flow conditioning opening 14 may manipulate fluid flow downhole to directed fluid with higher concentrations of proppant (e.g. at lines B and C) into the perforations 12a,12b and their corresponding fractures (not shown) extending therefrom. Higher concentrations of proppant in the perforations 12a, 12b may translate to more homogenous proppant distribution extending deeper into the formation for each of the corresponding fractures.

During proppant placement, a treatment fluid comprising the proppant particles dispersed in the carrier fluid may be introduced into the wellbore 4. The spacing between the flow conditioning opening 14 and the perforations 12a,12b may depend on, inter alia, the composition and properties of the carrier fluid (e.g., viscosity, concentration of proppant particles, and the like), the flow rate of the carrier fluid, the size and shape of the proppant particles, and the like, and any combination thereof. For example, the spacing between the flow conditioning opening 14 and the perforations 12a, 12b may be greater when a viscosified carrier fluid is used because the increased viscosity may mitigate the tendency of the proppant particles to return to the center of the wellbore 4 after the flow direction of the carrier fluid and proppant particles has been manipulated by the flow conditioning opening 14.

In some embodiments, the carrier fluid may be a non-Newtonian fluid (e.g., the viscosified carrier fluid), and the flow conditioning opening 14 may be within about 3 feet of the first perforation 12a. In some embodiments, the carrier fluid may be a Newtonian fluid (e.g., water or slickwater), and the flow conditioning opening 14 may be within about 1 foot of first perforation 12a.

As used herein, the term "Newtonian fluid" refers to a fluid in which the viscous stresses arising from its flow are linearly proportional to the local strain rate. Examples of Newtonian fluids may include, but are not limited to, aqueous fluids (e.g., fresh water, saltwater, seawater, brines, and the like), aqueous-miscible fluids (e.g., alcohols, glycerins, glycols, polyglycols amines, polyols, and the like), or combinations thereof may optionally include gelling agents in at a sufficiently low concentration to maintain a Newtonian fluid.

As used herein, the term "non-Newtonian fluid" refers to a fluid with flow properties that differ in any way from a Newtonian fluid. Examples of non-Newtonian fluids may include, but are not limited to, aqueous fluids (e.g., fresh water, brines, and the like), aqueous-miscible fluids, emulsions, or combinations thereof that are viscosified with gelling agents in a sufficient concentration to yield a non-Newtonian fluid.

Examples of gelling agents may include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellu lose, and carboxymethylhydroxyethylcellulose), xanthan, scleroglucan, succinoglycan, diutan, 2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and the like, derivatives thereof, and any combination thereof.

Examples of materials suitable for use as proppant particulates may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh or less on the U.S. Sieve Series; however, in certain circumstances, other sizes or mixtures of sizes may be desired and will be entirely suitable for practice of the embodiments of the present invention. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention. In some embodiments, the proppant particulates may be present in a treatment fluid in an amount in the range of from about 0.5 pounds per gallon ("ppg") to about 30 ppg by volume of the carrier fluid.

While FIGS. 1-3 illustrates one flow conditioning opening 14 corresponding to two perforations 12, one flow conditioning opening 14 may correspond to any number of perforations 12. In some embodiments, one flow conditioning opening 14 may correspond to 1 to 10 perforations 12, or any subset therebetween.

While FIGS. 1-3 illustrates each perforation cluster 10 includes two conditioning perforations 14 with corresponding perforations 12 (also referred to herein as "flow conditioning opening/perforation combinations"), each perforation cluster 10 may independently have any number of flow conditioning opening/perforation combinations. In some embodiments, a perforation cluster 10 may include 1 to 10 flow conditioning opening/perforation combinations.

Within a perforation cluster 10 having multiple flow conditioning opening/perforation combinations, each of the flow conditioning opening/perforation combinations may be oriented relative to each other in any suitable configuration.

Figure 4:
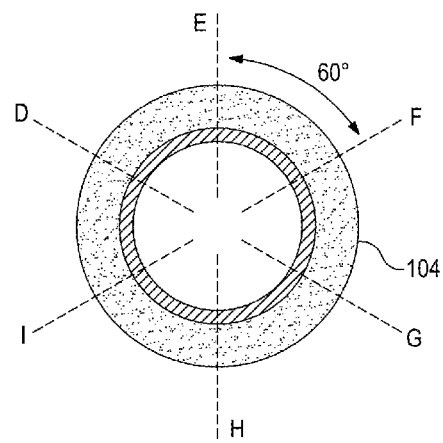
FIG. 4 illustrates an axial cross-sectional diagram of a wellbore with six flow conditioning opening/perforation combinations according to at least some embodiments described herein.
Figure 5:
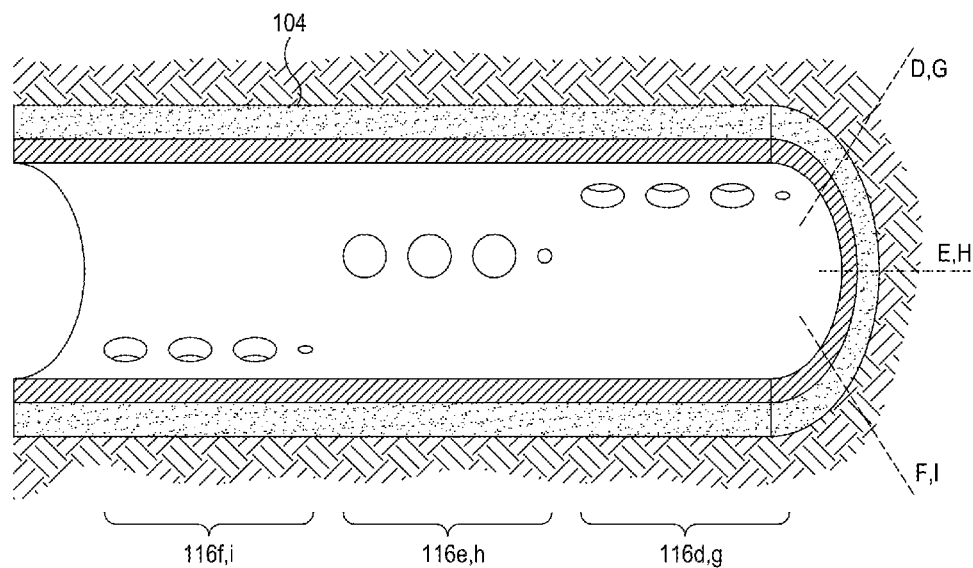
FIG. 5 illustrates a cross-sectional diagram along the wellbore with six flow conditioning opening/perforation combinations according to at least some embodiments described herein.

FIGS. 4 and 5 provide an axial cross-sectional diagram of a wellbore 104 and a cross-sectional diagram along the wellbore 104, respectively, with six flow conditioning opening/perforation combinations 116*d-i*. Each of the flow conditioning opening/perforation combinations 116*d-i* are radially phased at 60° as illustrated with lines D-I in FIG. 4. Additionally, the flow conditioning opening/perforation combinations 116*d-i* are axially offset such that the flow conditioning opening/perforation combinations 116*d,g* correspond axially along the wellbore 104 and are uphole of the flow conditioning opening/perforation combinations 116*e,h*, which correspond axially along the wellbore 104 and are uphole of the flow conditioning opening/perforation combinations 116*f,i*. As illustrated, the axial location of the flow conditioning opening/perforation combinations 116*d,e,f* along the wellbore do not overlap. However, in alternate embodiments, the axial location of the flow conditioning opening/perforation combinations 116*d,e,f* along the wellbore may at least partially overlap.

As used herein, the term "radial phased" refers to an equidistant radial offset about the entire wellbore. For example, 90° radially phased flow conditioning opening/perforation combinations 116 refers to four flow conditioning opening/perforation combinations 116 with a radial spacing of 90°. In some embodiments, a perforation cluster 10 may include a suitable number of flow conditioning opening/perforation combinations 116 to provide for radially phasing of 30°, 32.7°, 36°, 40°, 45°, 51.4°, 60°, 72°, 90°, 120°, or 180°.

As used herein, the term "radially offset" refers to the radial spacing of a given number of flow conditioning opening/perforation combinations 116 and does not imply symmetric radial spacing about the wellbore. In some embodiments, a perforation cluster 10 may include at least two flow conditioning opening/perforation combinations 116 with at each of the conditioning perforation/perforation combinations 116 independently being radially offset by about 30° to about 180° from the next radially-closest conditioning perforation/perforation combination 116.

As used herein, the term "axially offset," when describing the location along the wellbore of two or more flow conditioning opening/perforation combinations 116 relative to each other, refers to the axial distance between the first flow conditioning opening 14 of each of the flow conditioning opening/perforation combinations 116. In some embodiments, within a perforation cluster 10, two or more flow conditioning opening/perforation combinations 116 may have no axial offset (e.g., as illustrated as 116d and 116g in FIG. 5). In some embodiments, within a perforation cluster 10, two or more flow conditioning opening/perforation combinations 116 may be axially offset by up to about 6 feet. In some instances, a perforation cluster 10 may include a plurality of flow conditioning opening/perforation combinations 116 with a combination of the foregoing axial offset configurations (e.g., as illustrated in FIG. 5).

One skilled in the art would recognize that the foregoing description and ranges relative to the radial phase, radial offset, and axial offset are preferred ranges and, in practice, values outside these preferred ranges may be implemented.

In some embodiments, at least one perforation cluster that includes at least one flow conditioning opening/perforation combination described herein may be produced in a wellbore penetrating a subterranean formation. Then, in some embodiments, at least one fracture may be created or extended from the perforation and a treatment fluid that includes proppant particulates dispersed in a carrier fluid may be introduced into the wellbore to form a proppant pack in the at least one fracture.

Forming the perforation clusters described herein may be by any suitable method or apparatus. For example, in some embodiments, the perforations may be formed with a fluid jetting apparatus (e.g., a hydrajetting tool). Examples of suitable fluid jetting apparatuses and the operation thereof, which may be modified to achieve perforation clusters with at least one flow conditioning opening/perforation combination described herein, are disclosed in each of U.S. Publication No. 2011/0088915 to Stanojcic et al., U.S. Publication No. 2010/0044041 to Smith et al., and U.S. Pat. No. 7,874,365 to East et al.

Figure 6:
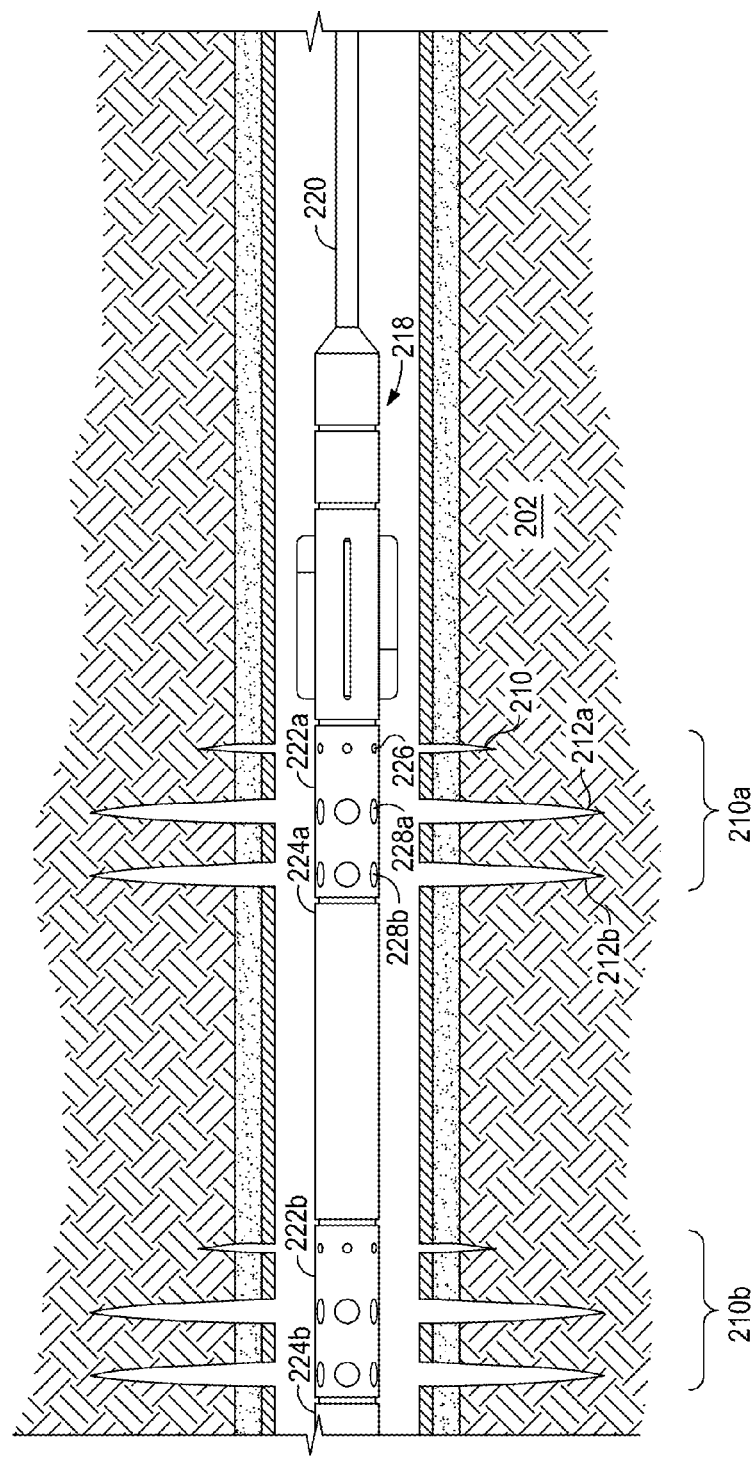
FIG. 6 illustrates a portion of an exemplary fluid jetting apparatus according to at least some embodiments described herein.

FIG. 6 illustrates a portion of an exemplary fluid jetting apparatus 218 according to at least some embodiments described herein. The fluid jetting apparatus 218 is coupled to a conveyance 220 (e.g., a work string, a coiled tubing string, a wireline, a tractor, and the like) and includes a series of hydrajetting portions 222a,b coupled by coupling portions 224a,b. As illustrated, each of the hydrajetting portions 222a,b includes a flow conditioning opening 226 that is upstream of and smaller than perforation fluid ports 228a,b having a smaller cross-sectional area) for producing appropriately sized corresponding flow conditioning opening 210 and the perforations 212a,b, respectively. In some instances, the flow conditioning openings 226 and perforation fluid ports 228a,b may be fitted with nozzles (not shown).

Alternatively, the flow conditioning opening 226 may be the same size as the perforation fluid ports 228a,b but configured to produce a lower strength jet of fluid, thereby forming an appropriately sized flow conditioning opening 210 relative to the perforations 212a,b.

Alternate configurations and numbers of the flow conditioning openings 226 and the perforation fluid ports 228 may be implemented at the hydrajetting portions 222 of the fluid jetting apparatus 218 to achieve the perforation clusters with at least one flow conditioning opening/perforation combination described herein. Accordingly, the description and configurations described herein relative to the flow conditioning opening 14, the perforations 12a,b, and the flow conditioning opening/perforation combinations 116d-i of FIGS. 1-5 may apply to configuration of the flow conditioning openings 226 and the perforation fluid ports 228.

In some embodiments, the perforations may be formed with a perforating gun assembly. Such a perforating gun assembly may be configured to detonate explosive charges that form the perforation clusters with at least one flow conditioning opening/perforation combination described herein. Examples of suitable perforating gun assemblies and the operation thereof, which may be modified to achieve perforation clusters with at least one flow conditioning opening/perforation combination described herein, are disclosed in each of U.S. Publication No. 2011/0000669 to Barlow et al., U.S. Pat. No. 6,851,471 to Barlow et al., and U.S. Pat. No. 4,762,067 to Barker et al.

Figure 7:
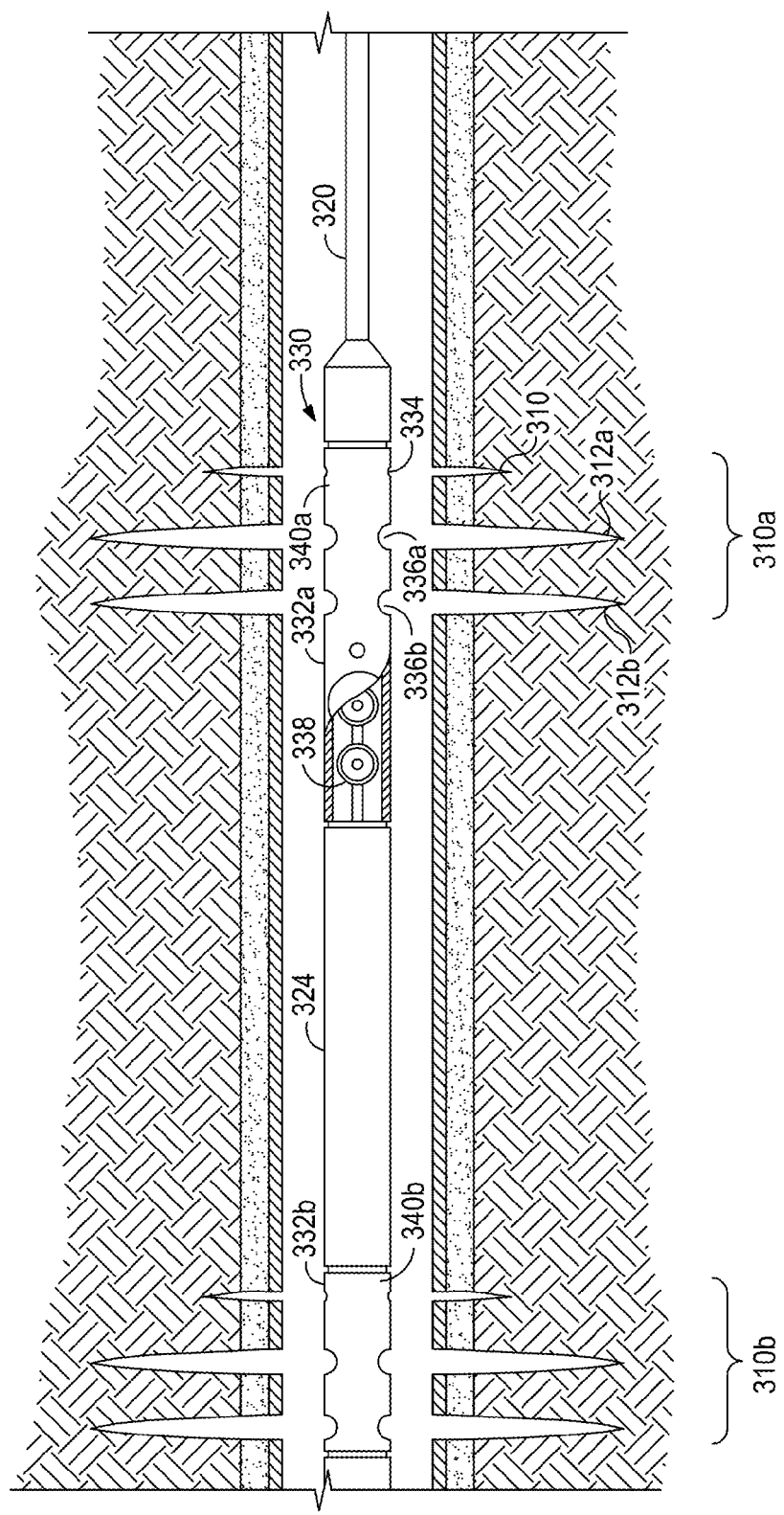
FIG. 7 illustrates a portion of an exemplary perforating gun assembly according to at least some embodiments described herein.

FIG. 7 illustrates a portion of an exemplary perforating gun assembly 330 according to at least some embodiments described herein. The perforating gun assembly 330 is coupled to a conveyance 320 and includes a series of perforating guns 332a,b coupled by coupling portions 324. Each perforating gun 332a,b includes a cylindrical sleeve 340a,b having a plurality of radially reduced areas depicted as scallops or recesses. Specifically, the recesses include flow conditioning openings 334 that are upstream of and smaller than the corresponding perforation recesses 336a,b.

Radially aligned with each of the recesses 334,336a,b is a respective one of a plurality of shaped charges 338, only two of which are visible in FIG. 7. Generally, the size of the shape charges 338 correspond to the size of the corresponding recess 334,336a,b. Therefore, the shape charge 338 corresponding to the flow conditioning openings 334 is smaller than the shape charge 338 corresponding to the perforation recesses 336a,b for producing appropriately sized corresponding flow conditioning opening 310 and the perforations 312a,b, respectively.

Alternatively, the flow conditioning openings 334 may be the same size as the perforation recesses 336a,b but fitted with smaller or lower explosive strength shape charge 338, thereby forming an appropriately sized flow conditioning opening 310 relative to the perforations 312a,b.

Alternate configurations and numbers of the flow conditioning openings 334, the perforation recesses 336a,b, and the corresponding shape charges 338 may be implemented at the perforating guns 332a,b of the perforating gun assembly 330 to achieve the perforation clusters with at least one flow conditioning opening/perforation combination described herein. Accordingly, the description and configurations described herein relative to the flow conditioning opening 14, the perforations 12a,b, and the flow conditioning opening/perforation combinations 116d-i of FIGS. 1-5 may apply to configuration of the flow conditioning openings 334, the perforation recesses 336a,b, and the corresponding shape charges 338.

In some embodiments, a casing string or liner may be perforated prior to placement within a wellbore. Such a perforating gun assembly may be configured to detonate explosive charges that form the perforation clusters with at least one flow conditioning opening/perforation combination described herein. Examples of suitable sliding sleeves and the operation thereof, which may be modified to achieve perforation clusters with at least one flow conditioning opening/perforation combination described herein, are disclosed in each of U.S. Publication No. 2011/0088915 to Stanojcic et al. and U.S. Publication No. 2010/0044041 to Smith et al.

Figure 8:
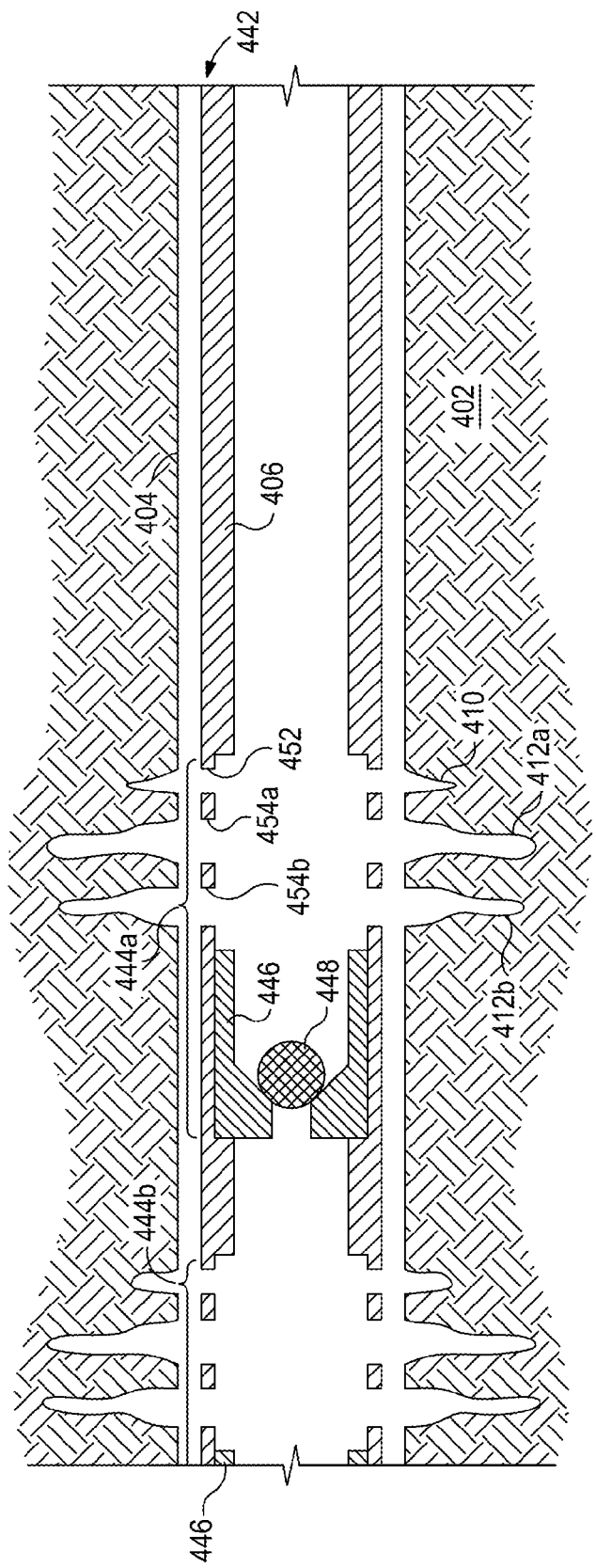
FIG. 8 illustrates a portion of an exemplary sliding sleeve assembly according to at least some embodiments described herein.

FIG. 8 illustrates a portion of an exemplary sliding sleeve assembly 442 according to at least some embodiments described herein. The sliding sleeve assembly 442 includes a series of recessed sections 444a,b (only a portion of recessed section 444b is illustrated). Each of the recessed sections 444a,b includes a ported section 446a,b where a portion of the casing 406 is ported with a flow conditioning opening 452 uphole the perforation ports 454a,b (illustrated with two perforation ports). The recessed sections 444a,b also includes a sliding sleeve 446 operably slideable along the recessed section 444a,b from a closed position (not shown) that prevents fluid flow through the ports 454,454a, 454b to an open position (illustrated) that allows fluid flow through the ports 454,454a,454b.

As illustrated the sliding sleeve 446 is actuated with a ball 448. In some instances, a spring or other biasing member may be included to move the sliding sleeve 446 from the open position to the closed position when the ball 448 is removed. Alternatively, the sliding sleeve 446 may be actuated with a mechanical shifting tool, another obturating member (e.g., a dart), a wireline tool, a pressure differential, a rupture disc, a biasing member (e.g., a spring), or a combination thereof.

When in the open position, the pressure of a fluid in the casing 406 may be increased to create a flow conditioning opening 410 and perforations 412a,b in the wellbore 404 penetrating the subterranean formation 402 that correspond to the flow conditioning opening 452 and the perforation ports 454a,b, respectively.

Alternate configurations and numbers of the flow conditioning opening 452 and the perforation ports 454a,b may be implemented at the ported sections 446a,b of the exemplary sliding sleeve assembly 442 to achieve the perforation clusters with at least one flow conditioning opening/perforation combination described herein. Accordingly, the description and configurations described herein relative to the flow conditioning opening 14, the perforations 12a,b, and the flow conditioning opening/perforation combinations 116d-i of FIGS. 1-5 may apply to configuration of the flow conditioning opening 452 and the perforation ports 454a,b.

While FIGS. 1-8 depict perforation clusters and flow conditioning opening/perforation combinations in horizontal wellbores, the methods and apparatuses described herein may apply to wellbores at any angle including, but not limited to, vertical wells, deviated wells, highly deviated wells, horizontal wells, and hybrid wells comprising sections of any combination of the aforementioned wells. In some embodiments, a subterranean formation and wellbore may be provided with an existing fracture network. As used herein, the term "deviated wellbore" refers to a wellbore in which any portion of the well is oriented between about 55-degrees and about 125-degrees from a vertical inclination. As used herein, the term "highly deviated wellbore" refers to a wellbore that is oriented between about 75-degrees and about 105-degrees off-vertical.

Embodiments disclosed herein include Embodiment A, Embodiment B1, Embodiment B2, Embodiment C, and Embodiment D.

Embodiment A

A method that includes producing a perforation cluster in a wellbore penetrating a subterranean formation, wherein the perforation cluster includes a flow conditioning opening extending from the wellbore into the subterranean formation that is aligned axially along the wellbore with and uphole of a perforation, wherein the flow conditioning opening has at least one of the following characteristics selected from the group consisting of: the flow conditioning opening having a smaller cross-sectional area at a wellbore face than the perforation, the flow conditioning opening having a smaller volume in the subterranean formation than the perforation, the flow conditioning opening having a smaller depth into the subterranean formation than the perforation, and any combination thereof.

Embodiment A may have one or more of the following additional elements in any combination: Element A1: wherein the perforation is a first perforation and the perforation cluster further includes a second perforation, and wherein the flow conditioning opening, the first perforation, and the second perforation are aligned axially along the wellbore with the flow conditioning opening uphole of the first and second perforations; Element A2: Element A1 wherein the flow conditioning opening, the first perforation, and the second perforation are within about 3 feet of each other; Element A3: the method further including creating or extending at least one fracture from the perforation; introducing the treatment fluid comprising proppant particulates dispersed in a carrier fluid into the wellbore; and forming a proppant pack comprising the proppant particulates in the at least one fracture; Element A4: Element A3 wherein the carrier fluid is a non-Newtonian fluid, and wherein the flow conditioning opening and the perforation are within about 3 feet of each other; Element A5: Element A3 wherein the carrier fluid is a Newtonian fluid, wherein the flow conditioning opening and the perforation are within about 1 foot of each other; Element A6: wherein a cross-sectional area of the perforation is at least about 1.1 times greater than the cross-sectional area of the flow conditioning opening; Element A7: wherein a volume of the perforation in the subterranean formation is at least about 2 times greater than the volume of the flow conditioning opening in the subterranean formation; Element A8: wherein a depth of the perforation is at least about 1.5 times greater than the depth of the flow conditioning opening; Element A9: wherein the perforation is a first perforation, the flow conditioning opening is a first flow conditioning opening, and the perforation cluster further includes a second flow conditioning opening aligned axially along the wellbore with and uphole of a second perforation, and wherein the first perforation and the second perforation are radially offset by at least 30°; Element A10: Element A9 wherein the first perforation and the second perforation are axially offset by 6 feet or less; Element A11: wherein a portion of the wellbore is highly-deviated; Element A12: wherein producing the perforation cluster is performed with the fluid jetting apparatus of Embodiment B1 or B2 optionally including additional Elements B1-B11; Element A13: wherein producing the perforation cluster is performed with the perforating gun assembly of Embodiment C optionally including additional Elements C1-C11; and Element A14: wherein producing the perforation cluster is performed with the sliding sleeve assembly of Embodiment D optionally including additional Elements D1-D11.

By way of non-limiting example, exemplary combinations applicable to Embodiment A include: Element A1 in combination with Element A9 and optionally at least one of Elements A2 or A10; at least two of Elements A6-A8 in combination; Element A1 in combination with at least one of Elements A6-A8 in combination and optionally Element A2; Element A9 in combination with at least one of Elements A6-A8 and optionally Element A10; Element A3 and optionally one of Elements A4 or A5 in combination with any of the foregoing; and Element A11 in combination with any of the foregoing. Further, Elements A12-A14 may be used in combination with any of the foregoing such that the apparatus producing the perforation cluster is appropriately configured.

Embodiment B1

A fluid jetting apparatus that includes a hydrajetting portion having a flow conditioning opening that is aligned axially along the hydrajetting portion with and upstream of a perforation fluid port, wherein the flow conditioning opening has a smaller cross-sectional area than the perforation fluid port.

Embodiment B2

A fluid jetting apparatus that includes a hydrajetting portion having a flow conditioning opening that is aligned axially along the hydrajetting portion with and upstream of a perforation fluid port, wherein the flow conditioning opening is configured to produce a lower strength jet of fluid as compared to the perforation fluid port.

Embodiment B1 and B2 may have one or more of the following additional elements in any combination: Element B1: wherein a cross-sectional area of the perforation fluid port is at least about 1.1 times greater than the cross-sectional area of the flow conditioning opening; Element B2: wherein the flow conditioning opening and the perforation fluid port are within about 3 feet of each other; Element B3: wherein the perforation fluid port is a first perforation fluid port and the hydrajetting portion further includes a second perforation fluid port, wherein the flow conditioning opening, the first perforation fluid port, and the second perforation fluid port are aligned axially along the hydrajetting portion with the flow conditioning opening upstream of the first and second perforation fluid ports; Element B4: Element B3 wherein the flow conditioning opening, the first perforation fluid port, and the second perforation fluid port are within about 3 feet of each other; Element B5: the fluid jetting apparatus further including a nozzle at each of the flow conditioning opening and the perforation fluid port; Element B6: wherein the hydrajetting portion is a first hydrajetting portion and the fluid jetting apparatus further includes a second hydrajetting portion coupled to the first hydrajetting portion with a coupling portion; Element B7: Element B6 wherein the second hydrajetting portion includes a second flow conditioning opening that is aligned axially along the second hydrajetting portion with and upstream of a second perforation fluid port; Element B8: Element B7 wherein the first perforation fluid port and the second perforation fluid port are radially offset by at least 30°; Element B9: wherein the flow conditioning opening is a first flow conditioning opening, the perforation fluid port is a first perforation fluid port, and the hydrajetting portion further includes a second flow conditioning opening that is aligned axially along the hydrajetting portion with and upstream of a second perforation fluid port; Element B10: Element B9 wherein the first perforation fluid port and the second perforation fluid port are radially offset by at least 30°; and Element B11: Element B9 wherein the first perforation fluid port and the second perforation fluid port are axially offset by 6 feet or less.

By way of non-limiting example, exemplary combinations applicable to Embodiments B1 and B2 include: Element B3 and optionally Element B4 in combination with Element B6 and optionally at least one of Elements B7-B8; Element B3 and optionally Element B4 in combination with Element B9 and optionally at least one of Elements B10-B11; Element B6 and optionally at least one of Elements B7-B8 in combination with Element B9 and optionally at least one of Elements B10-B11; Element B1 in combination with any of the foregoing; and Element B5 in combination with any of the foregoing.

Embodiment C

A perforating gun assembly that includes a perforating gun that comprises (1) a cylindrical sleeve with a flow conditioning opening that is aligned axially along the perforating gun with and upstream of a perforation recess and (2) a shaped charge radially aligned with each of the flow conditioning opening and the perforation recess, wherein the shaped charge radially aligned with the flow conditioning opening is smaller than the shaped charge radially aligned with the perforation recess.

Embodiment C may have one or more of the following additional elements in any combination: Element C1: wherein the flow conditioning opening has a smaller cross-sectional area than the perforation recess; Element C2: Element C1 wherein a cross-sectional area of the perforation recess is at least about 1.1 times greater than the cross-sectional area of the flow conditioning opening; Element C3: wherein the flow conditioning opening and the perforation recess are within about 3 feet of each other; Element C4: wherein the perforation recess is a first perforation recess and the perforating gun further includes a second perforation recess, wherein the flow conditioning opening, the first perforation recess, and the second perforation recess are aligned axially along the perforating gun with the flow conditioning opening upstream of the first and second perforation recesses; Element C5: Element C4 wherein the flow conditioning opening, the first perforation recess, and the second perforation recess are within about 3 feet of each other; Element C6: wherein the perforating gun is a first perforating gun and the perforating gun assembly further includes a second perforating gun coupled to the first perforating gun with a coupling portion; Element C7: Element C6 wherein the second perforating gun includes a second flow conditioning opening with a corresponding shaped charge that is aligned axially along the second perforating gun with and upstream of a second perforation recess with a corresponding shaped charge; Element C8: Element C7 wherein the first perforation recess and the second perforation recess are radially offset by at least 30°; Element C9: wherein the flow conditioning opening is a first flow conditioning opening, the perforation recess is a first perforation recess, and the perforating gun further includes a second flow conditioning opening that is aligned axially along perforating gun with and upstream of a second perforation recess; Element C10: Element C9 wherein the first perforation recess and the second perforation recess are radially offset by at least 30°; and Element C11: Element C9 wherein the first perforation recess and the second perforation recess are axially offset by 6 feet or less.

By way of non-limiting example, exemplary combinations applicable to Embodiment C include: Element C4 and optionally Element C5 in combination with Element C6 and optionally at least one of Elements C7-C8; Element C4 and optionally Element C5 in combination with Element C9 and optionally at least one of Elements C10-C11; Element C6 and optionally at least one of Elements C7-C8 in combination with Element C9 and optionally at least one of Elements C10-C11; Element C1 and optionally Element C2 in combination with any of the foregoing; and Element C3 in combination with any of the foregoing.

Embodiment D

A sliding sleeve assembly that includes a casing having (1) a recessed section that includes a ported section with a flow conditioning opening that is aligned axially along the recessed section with and upstream of a perforation port, wherein the flow conditioning opening has a smaller cross-sectional area than the perforation port and (2) a sliding sleeve operably slideable along the recessed section from a closed position that prevents fluid flow through the flow conditioning opening and the perforation port to an open position that allows fluid flow through the flow conditioning opening and the perforation port.

Embodiment D may have one or more of the following additional elements in any combination: Element D1: wherein a cross-sectional area of the perforation port is at least about 1.1 times greater than the cross-sectional area of the flow conditioning opening; Element D2: wherein the flow conditioning opening and the perforation port are within about 3 feet of each other; Element D3: wherein the sliding sleeve is operably slideable along the recessed section via a mechanical shifting tool, an obturating member, a wireline tool, a pressure differential, a rupture disc, a biasing member, or a combination thereof; Element D4: wherein the perforation port is a first perforation port and the ported section further includes a second perforation port, wherein the flow conditioning opening, the first perforation port, and the second perforation port are aligned axially along the ported section with the flow conditioning opening upstream of the first and second perforation ports; Element D5: Element D4 wherein the flow conditioning opening, the first perforation port, and the second perforation port are within about 3 feet of each other; Element D6: wherein the recessed section and the sliding sleeve is a first recessed section and a first sliding sleeve and the sliding sleeve assembly further includes a second recessed section in the casing and a second sliding sleeve operably slideable along the second recessed section; Element D7: Element D6 wherein the second recessed section includes a second flow conditioning opening that is aligned axially along the second recessed section with and upstream of a second perforation port; Element D8: Element D7 wherein the first perforation port and the second perforation port are radially offset by at least 30°; Element D9: wherein the flow conditioning opening is a first flow conditioning opening, the perforation port is a first perforation port, and the recessed section further includes a second flow conditioning opening that is aligned axially along perforating gun with and upstream of a second perforation port; Element D10: Element D9 wherein the first perforation port and the second perforation port are radially offset by at least 30°; and Element D11: Element D9 wherein the first perforation port and the second perforation port are axially offset by 6 feet or less.

By way of non-limiting example, exemplary combinations applicable to Embodiment D include: Element D4 and optionally Element D5 in combination with Element D6 and optionally at least one of Elements D7-D8; Element D4 and optionally Element D5 in combination with Element D9 and optionally at least one of Elements D10-D11; Element D6 and optionally at least one of Elements D7-D8 in combination with Element D9 and optionally at least one of Elements D10-D11; Element D1 and optionally Element D2 in combination with any of the foregoing; and Element D3 in combination with any of the foregoing.

II. Wellbore Tool Wear

Figure 9:
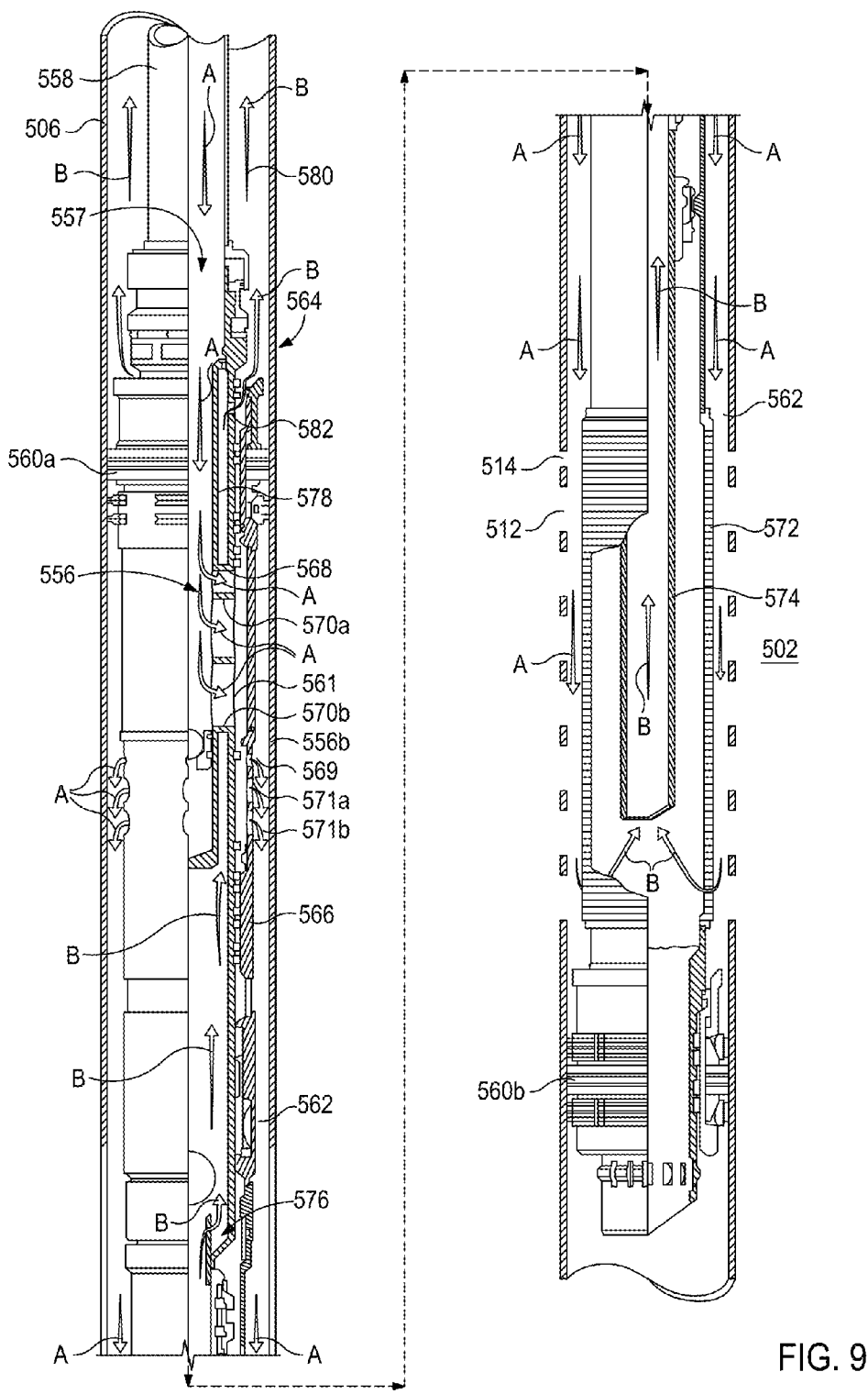
FIG. 9 illustrates exemplary crossover portions of a particulate delivery apparatus depicted in a circulating position according to at least some embodiments described herein.

FIG. 9 illustrates exemplary crossover portions 556a,b of a particulate delivery apparatus 557 depicted in a circulating position according to at least some embodiments described herein. The "circulating position" as used herein refers to a wellbore tool in a position suitable for flowing particulate laden fluid therethrough for forming a particulate pack in the wellbore, the subterranean formation, or both (e.g., a gravel pack or a proppant pack).

The particulate delivery apparatus 557 is connected to a work string 558 and disposed between two packers 560a,b. A particulate laden fluid is pumped down the work string 558, as indicated by the arrows A, in order to undertake circulation operations. Once reaching the crossover portions 556a,b, the particulate laden fluid in direction A is able to exit the crossover sub 556 via the circulating valve 134 and enter the annulus 562 between the crossover sub 556 and the casing 506. More particularly, a circulating sleeve 566 of the circulating valve 564 is depicted in its open position, thereby allowing the particulate laden fluid to exit the crossover tool 556 via a series of ports as indicated by the arrows A. As illustrated the series of ports includes (1) a flow conditioning opening 568 and at least one (illustrated as two) circulating ports 570a,b in the particulate delivery apparatus 557 leading to an annular flow space 561 formed between the particulate delivery apparatus 557 and the circulating sleeve 566 and (2) a flow conditioning opening 569 and at least one (illustrated as two) circulating ports 571a,b in the circulating sleeve 566 leading to the annulus 562.

Abrasive wear from the particulates in the fluid can be a significant issue at the crossover portions 556a,b because of this significant change of fluid flow direction. Typically, wear is most prevalent in the downstream ports (e.g., circulating ports 570b,571b), which may be due to most of the particulates flowing therethrough. Without being limited by theory, it is believed that the a flow conditioning opening 568,569 may enhance the amount of particulates flowing through upstream ports (e.g., circulating ports 570a,571a), which may reduce the wear on the downstream ports (e.g., circulating ports 570b,571b) and prolong the lifetime of the crossover portions 556a,b of the particulate delivery apparatus 557. This is of particular importance at the first crossover portion 556a where wear can lead to fluid communication with the return flow (described below), which causes the particulates to return to the surface rather than being placed in the wellbore, the subterranean formation, or both.

With continued reference to FIG. 9, as the particulate laden fluid enters the annulus 562, at least a portion of the particulates in the fluid is deposited within the annulus 562. Some of the liquid carrier and particulates, however, may enter the surrounding formation 502 through the one or more perforations formed in the casing 506 and extending into the formation. The perforations are illustrated to include a flow conditioning opening 514 and seven perforations 512.

The remainder of the fluid re-enters the crossover sub 556 via the sand control screen 572, as indicated by arrows B. The fluid carrier B then enters the wash pipe 574 and is conveyed upward towards the reverse-out valve 576. The fluid carrier B may be conveyed to and through a return conduit 578 in fluid communication with the annulus 580 defined between the work string 558 and the casing 506 above the upper packer 560a via one or more return ports 582. After flowing out of the crossover sub 556 via the return ports 582, the fluid carrier B may return to the surface via the annulus 580.

In a proppant pack operation in the circulation position, the particulate laden fluid may be continuously pumped down the work string 558 until fractures (not shown) extending from the perforations 512 are sufficiently filled with proppant.

In a gravel pack operation in the circulation position, the particulate laden fluid may be continuously pumped down the work string 558 until the annulus 562 around the sand control screen 572 is sufficiently filled with gravel. One skilled in the art will recognize that in a gravel pack operation, the perforations 512 and casing 506 may not be present where the gravel pack is placed. Rather, the gravel may enter natural fracture in the formation 502, and the wellbore may be uncased.

Alternate configurations and numbers of the flow conditioning openings 568,569 and the circulating ports 570a,b, 571a,b may be implemented at the crossover portions 556a,b of the particulate delivery apparatus 557 to mitigate wear. Accordingly, the description and configurations described herein relative to the flow conditioning opening 14, the perforations 12a,b, and the flow conditioning opening/perforation combinations 116d-i of FIGS. 1-5 may apply to configuration of the flow conditioning openings 568,569 and the circulating ports 570a,b,571a,b.

Figure 10:
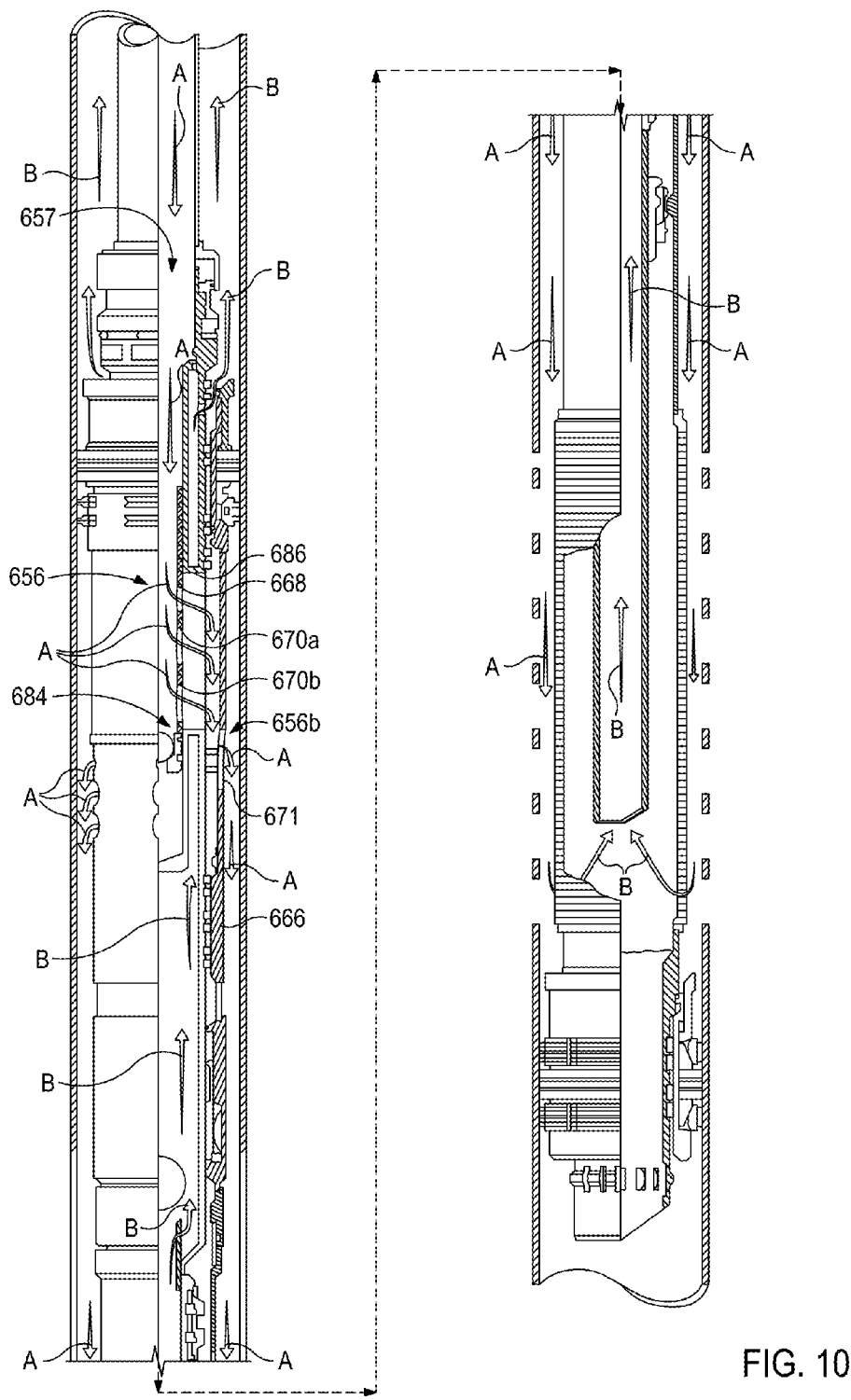
FIG. 10 illustrates an alternate embodiment of exemplary crossover portions of a particulate delivery apparatus depicted in a circulating position according to at least some embodiments described herein.

FIG. 10 illustrates an alternate embodiment of exemplary crossover portions 656a,b of a particulate delivery apparatus 657 depicted in a circulating position according to at least some embodiments described herein. The function and component so the particulate delivery apparatus 657 is similar to that of FIG. 9. However, in the illustrated embodiment, the particulate delivery apparatus 657 includes an insert 684 at the crossover portion 656a where the insert includes a flow conditioning opening 668 and at least one (illustrated as two) circulating ports 670a,b and the particulate delivery apparatus 657 includes a single port 686 radially aligned with the flow conditioning opening 668 and the circulating ports 670a,b. Use of the insert 684 may mitigate wear of the port 686 in the particulate delivery apparatus 657 where wear may lead to fluid communication with the return flow. Such a configuration may, in some instances, prolong the lifetime of the crossover portion 656a of the particulate delivery apparatus 657.

Additionally, FIG. 10 illustrates an alternate embodiment at the second crossover portion 656b in the circulating sleeve 666 with only one circulating port 671.

Additional design features and actuating details regarding crossover portions of particulate delivery apparatuses may be found in U.S. Pat. Nos. 5,636,691 and 5,988,271 and International Application No. PCT/US13/68037.

In alternative embodiments, to reduced particulate flow through the opening (e.g., to mitigate wear of the opening or components on the other side of the opening or to mitigate plugging of the opening by the particulates), a flow conditioning opening may be radially offset and upstream of an opening.

Figure 11:
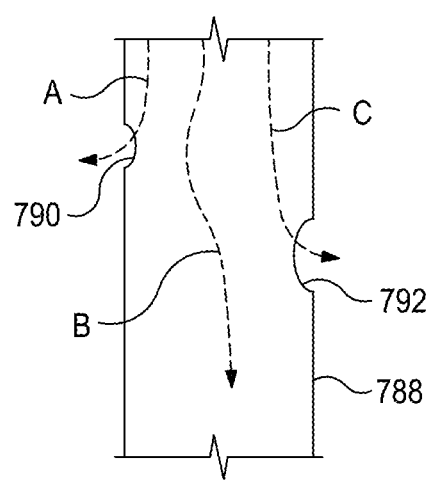
FIG. 11 illustrates a tubular having a flow conditioning opening upstream and radially offset from an opening.

FIG. 11 illustrates a tubular 788 having a flow conditioning opening 790 upstream and radially offset from an opening 792. As illustrated the flow conditioning opening 790 is 180° offset from the opening 792. Without being limited by theory, it is believed that when flowing particulate laden fluid through the tubular 788 such a configuration may reduce particulate flow through the opening 792. That is, some of the fluid may flow through the flow conditioning opening 790 illustrated at line A, which would pull fluid flowing along line B closer to that side of the tubular 788. Because the particulates in a particulate laden fluid tend to flow preferentially at the center of the tubular 788, the particulates would also be pulled toward the side of the tubular with flow conditioning opening 790. Then, the fluid flowing along line C that exits the tubular 788 via the opening 792 would be have less particulates therein. Accordingly, the abrasive wear to the opening 792 or an object on the other side of opening 792 would be reduced. Alternatively or additionally, where a smaller diameter tubing or passageway extends from the opening 792, such a configuration may reduce plugging of the opening. An exemplary wellbore tool where such configurations may be advantageous may tools that include shunt tubes, bypass conduits, manifold systems of a sand screen, and the like.

In some embodiments, the flow conditioning opening 790 may be radial offset from the opening 792 by about 30° to about 180°. The degree of radial offset may be influenced by, inter alia, the desired degree of particulate movement within the tubular, the composition and properties of the carrier fluid (e.g., viscosity, concentration of particulates, and the like), the flow rate of the carrier fluid, the size and shape of the particulates, and the like, and any combination thereof.

Alternate configurations and numbers of the flow conditioning opening 790 and the opening 792 may be implemented in tubulars if wellbore tools. Accordingly, the description and configurations described herein relative to the flow conditioning opening 14, the perforations 12a,b, and the flow conditioning opening/perforation combinations 116d-i of FIGS. 1-5 may apply to configuration of the flow conditioning opening 790 and the opening 792.

Further, while many of the examples provided herein describe axial alignment of a flow conditioning opening and a corresponding opening (e.g., perforation, recesses, ports, etc.), the radial offset of the flow conditioning opening and the opening described relative to FIG. 11 may be applied to alternate embodiments of such examples.

Embodiments disclosed herein include Embodiment E and F.

Embodiment E

A wellbore tool that includes a particulate delivery apparatus with a crossover portion that includes a flow conditioning opening that is aligned axially along the particulate delivery apparatus with and upstream of a circulation port when in a circulation configuration, wherein the flow conditioning opening has a smaller cross-sectional area than the circulation port.

Embodiment E may have one or more of the following additional elements in any combination: Element E1: wherein a cross-sectional area of the circulation port is at least about 1.1 times greater than the cross-sectional area of the flow conditioning opening; Element E2: wherein the flow conditioning opening and the circulation port are within about 3 feet of each other; Element E3: wherein the flow conditioning opening and the circulation port are part of an insert that extends into the crossover portion; Element E4: wherein the circulation port is a first circulation port and the crossover portion further includes a second circulation port, wherein the flow conditioning opening, the first circulation port, and the second circulation port are aligned axially along the crossover portion with the flow conditioning opening upstream of the first and second circulation ports; Element E5: Element E4 wherein the flow conditioning opening, the first circulation port, and the second circulation port are within about 3 feet of each other; Element E6:

wherein the crossover portion is a first crossover portion and the particulate delivery apparatus further includes a second crossover portion; and Element E7: Element E6 wherein the second crossover portion includes a second flow conditioning opening that is aligned axially along the particulate delivery apparatus with and upstream of a second circulation port.

By way of non-limiting example, exemplary combinations applicable to Embodiment E include: Element E4 and optionally Element E5 in combination with Element E6 and optionally Element E7; Element E1 in combination with any of the foregoing; Element E2 in combination with any of the foregoing; and Element E3 in combination with any of the foregoing.

Embodiment F

A wellbore tool that includes a tubular with a flow conditioning opening upstream of and radially offset by at least 30° from an opening, wherein the flow conditioning opening has a smaller cross-sectional area than the opening.

Embodiment F may have one or more of the following additional elements in any combination: Element F1: wherein a cross-sectional area of the opening is at least about 1.1 times greater than the cross-sectional area of the flow conditioning opening; Element F2: wherein the flow conditioning opening and the opening are within about 3 feet of each other; Element F3: wherein the opening is a first opening and the tubular further includes a second opening, wherein the flow conditioning opening is radially offset by at least 30° from the second opening; Element F4: Element F3 wherein the first and second openings are axially aligned along the tubular; Element F5: Element F3 wherein the first and second openings are radially aligned along the tubular; Element F6: Element F3 wherein the flow conditioning opening, the first opening, and the second opening are within about 3 feet of each other; Element F7: wherein the flow conditioning opening is a first flow conditioning opening and the opening is a first opening, wherein the tubular further includes a second flow conditioning opening upstream of and radially offset by at least 30° from a second opening, and wherein the first flow conditioning opening and the first opening are upstream of the second flow conditioning opening and the second opening; Element F8: Element F7 wherein the first and the second flow conditioning openings are axially aligned along the tubular; Element F9: Element F7 wherein the first and the second openings are axially aligned along the tubular; Element F10: the wellbore tool further including a passageway extending from the flow conditioning opening; and Element F11: the wellbore tool further including a passageway extending from the opening.

By way of non-limiting example, exemplary combinations applicable to Embodiment F include: Element E3 and Element E6 in combination with one of Elements E5 or E6; Element E7 in combination with Elements E8 and E9; Element E3 in combination with Element E7; Element E1 in combination with any of the foregoing; Element E2 in combination with any of the foregoing; Element E3 in combination with any of the foregoing; and at least one of Elements E10-E11 in combination with any of the foregoing.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Figure 12A:
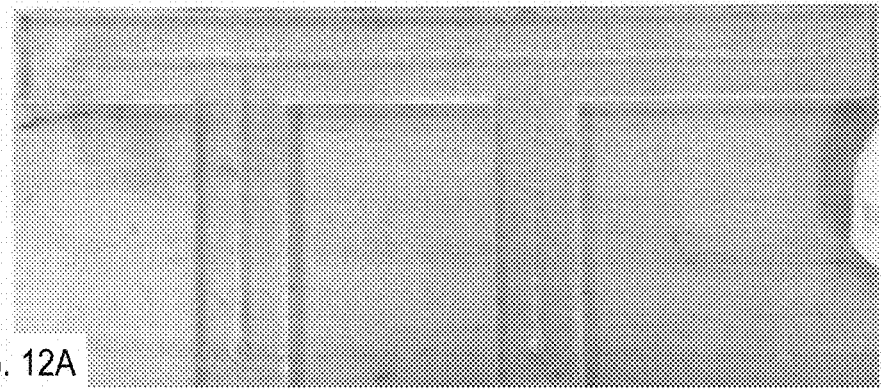
FIG. 12A provides a photograph of a microchannel with two sidechannels at axially aligned T-junctions.
Figure 12B:
FIGS. 12B-C provides micrographs of the first and second T-junctions of FIG. 12A during fluid flow.
Figure 12C:

Sand particles were dispersed in an aqueous fluid including a linear gel. The particulate laden fluid was flowed into a microchannel system with two side channels at axially aligned T-junctions (see FIG. 12A). The fluid and particulate flow was monitored by light microscopy. Before the first T-junction, the sand particles are located primarily in the center portion of the microchannel (see FIG. 12B). The carrier fluid and a portion of the sand particles flow into the side channel of the first T-junction. The remaining sand particles are moved within the microchannel toward the microchannel wall having the side channel. Because the T-junctions are axially aligned, the sand particles are then closer to the side channel of the second T-junction (see FIG. 12C) for placement therein. This example demonstrates that flow conditioning openings may be useful in manipulating fluid flow.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   producing a perforation cluster in a wellbore penetrating a subterranean formation, wherein the perforation cluster includes a flow conditioning opening extending from the wellbore into the subterranean formation that is aligned axially along the wellbore with and uphole of a perforation,
   wherein the flow conditioning opening has at least one of the following characteristics selected from the group consisting of: the flow conditioning opening having a smaller cross-sectional area at a wellbore face than the perforation, the flow conditioning opening having a smaller volume in the subterranean formation than the perforation, the flow conditioning opening having a smaller depth into the subterranean formation than the perforation, and any combination thereof.

2. The method of claim 1, wherein the perforation is a first perforation and the perforation cluster further includes a second perforation, and wherein the flow conditioning opening, the first perforation, and the second perforation are aligned axially along the wellbore with the flow conditioning opening uphole of the first and second perforations.

3. The method of claim 2, wherein the flow conditioning opening, the first perforation, and the second perforation are within about 3 feet of each other.

4. The method of claim 1, further comprising:
   creating or extending at least one fracture from the perforation;
   introducing a treatment fluid comprising proppant particulates dispersed in a carrier fluid into the wellbore; and
   forming a proppant pack comprising the proppant particulates in the at least one fracture.

5. The method of claim 4, wherein the carrier fluid is a non-Newtonian fluid, and wherein the flow conditioning opening and the perforation are within about 3 feet of each other.

6. The method of claim 4, wherein the carrier fluid is a Newtonian fluid, wherein the flow conditioning opening and the perforation are within about 1 foot of each other.

7. The method of claim 1, wherein a cross-sectional area of the perforation is at least about 1.1 times greater than the cross-sectional area of the flow conditioning opening.

8. The method of claim 1, wherein a volume of the perforation is at least about 2 times greater than the volume of the flow conditioning opening.

9. The method of claim 1, wherein a depth of the perforation is at least about 1.5 times greater than the depth of the flow conditioning opening.

10. The method of claim 1, wherein the perforation is a first perforation, the flow conditioning opening is a first flow conditioning opening, and the perforation cluster further includes a second flow conditioning opening extending from the wellbore into the subterranean formation that is aligned axially along the wellbore with and uphole of a second perforation, and wherein the first perforation and the second perforation are radially offset by at least 30°.

11. The method of claim 10, wherein the first perforation and the second perforation are axially offset by 6 feet or less.

12. The method of claim 1, wherein a portion of the wellbore is highly-deviated.

13. A wellbore tool comprising:
    a tubular having a flow conditioning opening that is aligned axially along the tubular with and upstream a port or a recess, wherein the flow conditioning opening has a smaller cross-sectional area than the port or the recess,
    wherein the flow conditioning opening has at least one of the following characteristics selected from the group consisting of: the flow conditioning opening having a smaller cross-sectional area at a wellbore face than the port or the recess, the flow conditioning opening having a smaller volume in the subterranean formation than the port or the recess, the flow conditioning opening having a smaller depth into the subterranean formation than the port or the recess, and any combination thereof.

14. The wellbore tool of claim 13, wherein a cross-sectional area of the port or the recess is at least about 1.1 times greater than the cross-sectional area of the flow conditioning opening.

15. The wellbore tool of claim 13, wherein the flow conditioning opening and the port or the recess are within about 3 feet of each other.

16. The wellbore tool of claim 13, wherein the wellbore tool is a fluid jetting apparatus, wherein the port or the recess is a perforation fluid port, and wherein the fluid jetting apparatus comprises a hydrajetting portion formed at least in part by the tubular.

17. The wellbore tool of claim 13, wherein the wellbore tool is a perforating gun assembly, wherein the port or the recess is a perforation recess, and wherein the perforating gun assembly comprises (1) a cylindrical sleeve formed at least in part by the tubular and (2) shaped charges radially aligned with the flow conditioning opening and the perforation recess, wherein the shaped charge radially aligned with the flow conditioning opening is smaller than the shaped charge radially aligned with the perforation recess.

18. The wellbore tool of claim 13, wherein the wellbore tool is a sliding sleeve, wherein the port or the recess is a perforation port, and wherein the sliding sleeve comprises a casing that comprise (1) a recessed section that includes a ported section formed at least in part by the tubular and (2) a sliding sleeve operably slideable along the recessed section from a closed position that prevents fluid flow through the flow conditioning opening and the perforation port to an open position that allows fluid flow through the flow conditioning opening and the perforation port.

19. The wellbore tool of claim 13, wherein the wellbore tool is a particulate delivery apparatus with a crossover portion, wherein the port or the recess is a circulation port, and wherein the crossover portion comprises the tubular.

* * * * *